(12) United States Patent
Özyigit

(10) Patent No.: US 11,004,276 B2
(45) Date of Patent: May 11, 2021

(54) METHOD AND SYSTEM FOR MARKING CONSIGNMENT UNITS

(71) Applicant: Deutsche Post AG, Bonn (DE)

(72) Inventor: Ali Özyigit, Bonn (DE)

(73) Assignee: Deutsche Post AG

(*) Notice: Subject to any disclaimer, the term of this patent is extended or adjusted under 35 U.S.C. 154(b) by 72 days.

(21) Appl. No.: 16/143,638

(22) Filed: Sep. 27, 2018

(65) Prior Publication Data

US 2019/0096142 A1 Mar. 28, 2019

(30) Foreign Application Priority Data

Sep. 27, 2017 (DE) .......................... 102017217242.8

(51) Int. Cl.
| | | |
|---|---|---|
| *G01N 15/00* | (2006.01) | |
| *G07B 17/00* | (2006.01) | |
| *G06Q 10/08* | (2012.01) | |
| *G06Q 50/28* | (2012.01) | |
| *G06K 9/00* | (2006.01) | |

(52) U.S. Cl.
CPC ... *G07B 17/00435* (2013.01); *G06K 9/00577* (2013.01); *G06Q 10/08* (2013.01); *G06Q 10/083* (2013.01); *G06Q 10/0833* (2013.01); *G06Q 50/28* (2013.01); *G07B 17/00314* (2013.01); *G07B 17/00362* (2013.01); *G07B 17/00661* (2013.01); *G07B 2017/0037* (2013.01); *G07B 2017/00427* (2013.01); *G07B 2017/00443* (2013.01); *G07B 2017/00709* (2013.01)

(58) Field of Classification Search
USPC ........ 382/101–103, 112, 115, 116, 138–143, 382/312
See application file for complete search history.

(56) References Cited

U.S. PATENT DOCUMENTS

| | | | | |
|---|---|---|---|---|
| 6,728,391 B1* | 4/2004 | Wu | ........................... | B07C 1/00 |
| | | | | 209/583 |
| 2005/0105767 A1* | 5/2005 | Rosenbaum | ......... | G06Q 10/107 |
| | | | | 382/101 |
| 2008/0059219 A1* | 3/2008 | Chatte | ...................... | G07D 7/20 |
| | | | | 705/404 |
| 2008/0272585 A1* | 11/2008 | Conard | .............. | G06K 9/00577 |
| | | | | 283/67 |

(Continued)

FOREIGN PATENT DOCUMENTS

| | | |
|---|---|---|
| DE | 102005006005 | 11/2007 |
| DE | 102010022532 A1 | 12/2011 |
| WO | 2016203149 A1 | 12/2016 |

OTHER PUBLICATIONS

European Search Report for 18196252.3-1207/3462380 dated Jun. 27, 2019.

*Primary Examiner* — Marcellus J Augustin

(74) *Attorney, Agent, or Firm* — Tarolli, Sundheim, Covell & Tummino LLP

(57) ABSTRACT

The invention relates to a method for marking a consignment unit in a logistics process. The invention furthermore relates to a system for marking a consignment unit in a logistics process. The method according to the invention for marking a consignment unit in a logistics process contains the steps of initially creating a first image of the surface of a consignment unit in order to then link this image to an identification number and store the image and the identification number on a data processing unit.

11 Claims, 1 Drawing Sheet

(56) References Cited

U.S. PATENT DOCUMENTS

| | | | |
|---|---|---|---|
| 2010/0082151 A1* | 4/2010 | Young | G06Q 10/083 700/226 |
| 2012/0005187 A1 | 1/2012 | Chavanne | |
| 2014/0105452 A1* | 4/2014 | Bowne | G06K 9/00973 382/101 |
| 2014/0247962 A1* | 9/2014 | Kruger | G06K 9/00456 382/101 |
| 2015/0127573 A1* | 5/2015 | Amacker | G06K 9/00624 705/341 |
| 2018/0089507 A1* | 3/2018 | Desprez | G06K 9/325 |

\* cited by examiner

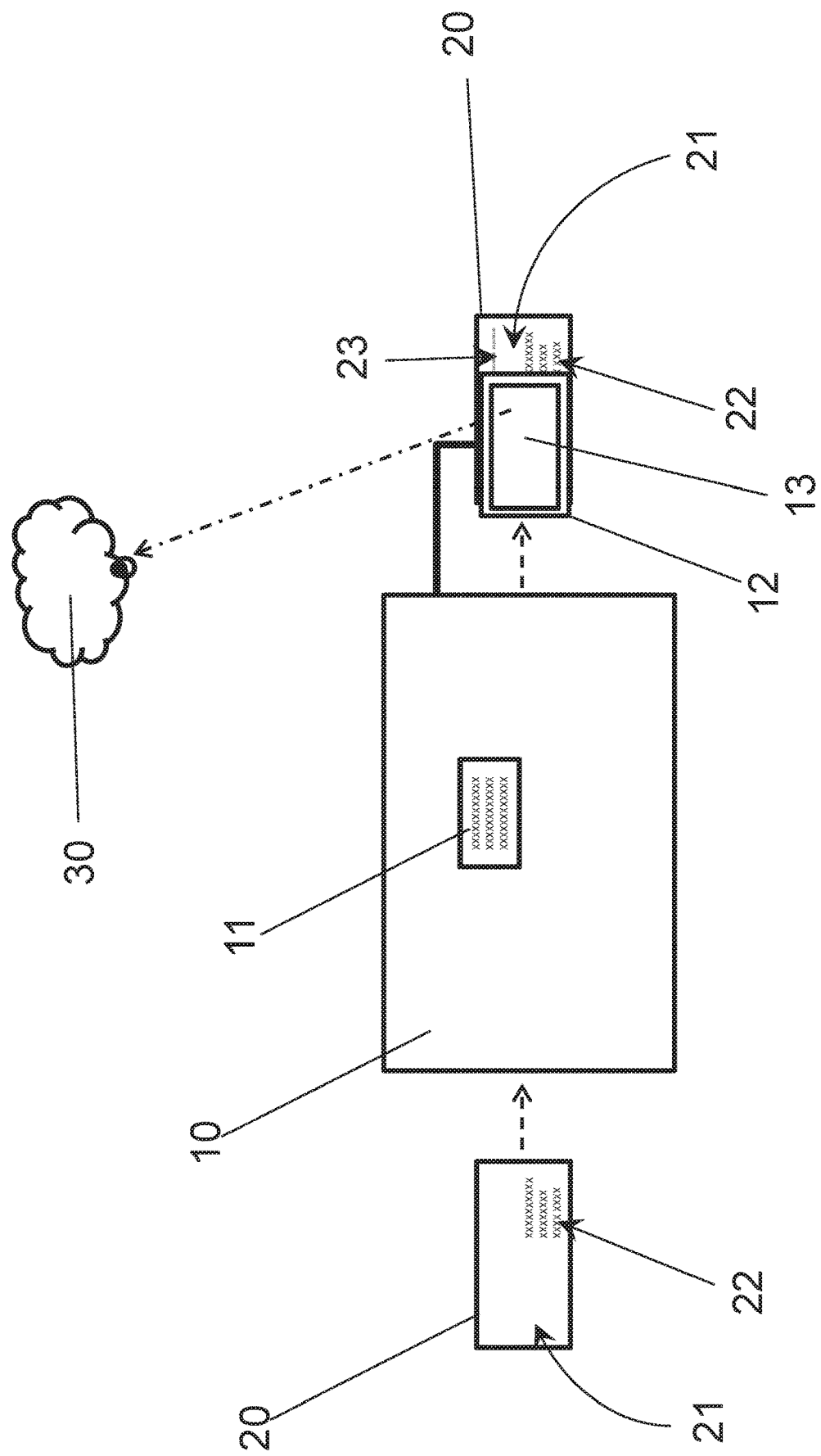

METHOD AND SYSTEM FOR MARKING CONSIGNMENT UNITS

RELATED APPLICATIONS

The present invention is a U.S. Non-Provisional patent application, claiming priority to DE 102017217242.8, filed on 27 Sep. 2017 the entirety of which is incorporated herein by reference.

The invention relates to a method for marking a consignment unit in a logistics process. The invention furthermore relates to a system for marking a consignment unit in a logistics process.

In logistics processes, it is customary for a consignment unit to be provided with an address, for the logistics fee to be paid by affixing a postage paid impression and for the consignment unit then to be delivered to a logistics service provider who transports the consignment unit to the addressee. A consignment unit may, for example, be a letter or a parcel. The postage paid impression can be affixed in the form of an adhesive postage stamp or parcel stamp or in printed form. The consignment unit can be delivered to a logistics service provider by inserting the consignment unit into an apparatus or through delivery to the service provider directly or through collection. The logistics service provider records the logistics-specific data of the consignment unit. These are, for example, the address data, sender data, timestamp and/or further data for the unique identification of the consignment unit.

Methods are known in the prior art with which the surface of consignment units, such as letters or parcels, are photographed or scanned, wherein information on these surfaces, in plain text or as code, is read. Information in plain text can be made machine-readable by means of OCR (optical character recognition).

In addition, a method and an apparatus for mail analysis are known from US patent application US 2012/0051587 A1. The method comprises receiving in a data processing system an image of a first mailpiece and associated machine-recognized data. The method includes comparing the machine-recognized data with a target list to determine a match with a target individual. The method additionally includes performing a writer identification process on the image of the first mailpiece when a match is determined between the machine-recognized data and the target individual. The writer identification process produces writer identification data associated with the mailpiece. The method furthermore comprises storing the image of the mailpiece and associated machine-recognized data and writer identification data.

In the known methods, it may occur that consignment units without postage paid impressions or with unrecognizable, or at least non-machine-recognizable, postage paid impressions are present in the logistics process. This may occur, for example, because adhesive postage paid impressions are lost during the handling of the consignment unit in the logistics process or the printing of imprinted postage paid impressions is illegible, for example due to lack of ink or wear of the printing device. In addition, it occurs that consignment units are provided with counterfeit postage paid impressions and are introduced into the logistics process. In known logistics processes, the franking of consignment units is monitored, since it also repeatedly occurs that consignment units are fed into the logistics process without a corresponding fee having been paid. The monitoring is normally carried out in automatic sorting plants, wherein consignment units without or without a recognizably valid postage paid impression can be extracted and, for example, fed to a manual check. If no valid postage paid impression is recognized here either, the corresponding consignment unit is normally returned to the sender. In other logistics processes, no manual check is carried out and a consignment unit on which no valid postage paid impression is automatically recognized is returned to the sender. These processes incur additional cost. In addition, customer satisfaction decreases if a consignment unit is returned to the sender even though it has a valid postage paid impression but this has not been at least automatically recognized.

The processes for unique marking of a consignment unit are furthermore complex: features for the unique marking of a consignment unit must either be additionally affixed and/or information already affixed for other purposes, such as, for example written text, must be rendered machine-readable, for example by means of an OCR process.

The object of the invention is to indicate a method for the unique marking of a consignment unit in a logistics process, wherein the complexity of the consignment unit marking is minimized. A further object of the invention is to indicate a system for marking a consignment unit in a logistics process by means of which the consignment unit can be marked and recognized again in the further logistics process.

This object and advantageous embodiments are achieved according to the invention by a method and a system as claimed.

The method according to the invention for marking a consignment unit in a logistics process contains the steps of initially creating a first image of the surface of a consignment unit, wherein the first image characterizes the consignment unit in order to then link this image to an identification number and store the image and the identification number on a data processing unit. The first image contains information relating to the surface structure of the consignment unit. With a corresponding resolution, the surface structure is unique and therefore characteristic of the consignment unit. The identification number can be generated at the time of the linking or can be obtained, for example, from a database created in advance. Simple and fast further processing is enabled by linking the image with an identification number. The image and the identification number may be stored, for example, on a central data processing unit. This may be a central data processing unit of the logistics service provider. The image can be recorded with a digital camera, for example also with the camera of a Smartphone. A Smartphone is understood to mean a mobile telephone which provides computer functionalities and connectivity and is equipped with a camera. Today's Smartphones have cameras with a resolution of several megapixels. With cameras with such a high resolution, it is possible to create an image of a consignment surface, wherein the surface structure of the consignment surface is mappable. This surface structure is unique, so that a consignment unit can be uniquely identified by it.

In one advantageous embodiment, the first image is stored as an image file.

In a further advantageous embodiment, the first image is created with a digital camera.

It has furthermore proven advantageous if the digital camera is integrated into a mobile device which is furthermore connected, for example wirelessly, to a data transmission network, for example the Internet, and has functionalities of a computer system, wherein the data transmission network is connected to a data processing unit and a computer program, by means of which the first image is transferred onto the data processing unit, runs on the mobile device. The mobile device may, for example, be a Smartphone. The computer program can be stored in the form of an app on the Smartphone. Smartphones are currently widely available. The method can be used, for example, in the case of a customer of a logistics service provider during the preparation of the delivery of consignment units to the logistics service provider. Today, it is customary for senders regularly shipping substantial quantities of consignment units to affix postage paid impressions to the consignment units by means of a franking machine. A franking machine of this type can be equipped, for example, with a mount for a Smartphone, wherein the method can be carried out by means of the franking machine equipped in this way and a corresponding Smartphone.

In one advantageous embodiment, a logistics fee is linked to the first image.

In a further advantageous embodiment, a second image of the consignment unit is created at a later time, wherein the second image is compared with the first image and the consignment unit is classified is identical if the first and the second image match one another to a previously input extent. In one embodiment, the previously input extent is at least 50%.

In a further advantageous embodiment, a logistics fee is determined with the creation of a first image of the consignment unit surface which characterizes the consignment unit and is linked to the first image and to the identification number linked to the first image and is stored on the data processing unit. The logistics fee can be determined via parameters of the consignment unit, such as, for example, its dimensions. The dimensions can be obtained from the recorded image of the consignment surface. Different logistics fees according to the dimensions of the consignment unit can be stored in a database. The weight of the consignment unit can also be used as a further parameter for determining the logistics fee. The weight of the consignment unit must be determined for this purpose. If the first image of the surface of the consignment unit is recorded, for example with a camera, for example the camera of a Smartphone, while the consignment unit is passing through a modified franking machine, it is conceivable for the franking machine to have a weighing machine and for the method to be designed in such a way that the weight of the consignment unit is recorded as it passes through the franking machine and is linked to the first image and to the identification number.

With the method according to the invention, it is possible to identify a consignment unit without a special feature previously being affixed to the consignment unit. The surface structure of a consignment unit has proven to be usable in the same way as a fingerprint to identify the consignment unit. Further data, such as the sender and/or recipient, can be allocated to the data stored on the data processing unit. During the later recording of a second image of the consignment unit surface, the consignment unit can be uniquely identified via a comparison with the first image.

The method according to the invention can also be used for the fee payment and fee checking of a mail consignment provided with an address if the camera of a Smartphone registered with a cell phone number is used as the camera. The computer system of the logistics company operating the method forms a virtual postage account which is set up for a user, wherein the logistics company operates local sorting centers. The mail consignment is first provided with a marker indicating that the franking takes place via the method. The user then creates an image of the consignment that is to be franked by means of the Smartphone camera. The recorded image is displayed on the Smartphone and the user checks the quality of the image, the legibility and completeness of the address and the marking of the franking method. If the image quality does not meet the requirements of the user, and/or the user thinks that the legibility and/or completeness of the address and/or the marking of the franking method are inadequate, he can repeat the recording of the image, possibly following optimization of recording parameters, such as, for example, the lighting, and/or the completion or improvement of the address and/or the marking of the franking method. The user then makes a product selection via the Smartphone, whereupon the image and the cell phone number of the Smartphone and information relating to the product selection are forwarded to the computer system of the logistics company. Further information, such as, for example, the image recording time, the cell phone number of the Smartphone, the network-based location and/or the precise location determined by means of GPS (Global Positioning System), the device number and model number of the Smartphone, the name and version of the operating system installed on the Smartphone, etc., can also be forwarded to the computer system of the logistics company. An image analysis is then performed on the computer system of the logistics company, wherein the image quality is checked against a predefined criterion and a predefined quality threshold and, if this quality threshold is not attained, an image optimization is performed and, if the quality threshold is not achieved following the optimization and/or the address and/or the franking method marking is/are not recognized, an error message is transmitted to the cell phone number, whereupon the method is ended, and wherein, in the case where the image quality is achieved immediately or following optimization, and if the address and the franking method marking are recognized, a first identification code is generated. An address check regarding the deliverability of the consignment can also be carried out in this step. The address can be checked, for example, for the presence of details relating to the street, zip code and town.

The first identification code enables the unique recognition once more of the consignment via an analysis of the image information without the need to affix a physical identification code. The first identification code and the cell phone number are then stored in the computer system of the logistics company. The virtual postage account of the user is then retrieved and the fee corresponding to the product selection made is debited, insofar as the corresponding cover is available, wherein an error message is transmitted to the cell phone number if no corresponding credit is available in the virtual postage account. In this case, the method is ended. Following the correct payment of the postage amount, a confirmation of the franking is transmitted to the cell phone number and the first identification code is forwarded via the computer system of the logistics company to the local sorting centers where a mapping of the consignment address and a generation of a second identification code are performed for consignments with the marking indicating that the franking is performed via the method, wherein the second identification code is then compared with the first identification code, wherein a further processing of the consignment is performed in the event of a match within previously defined limits, and wherein the consignment is otherwise extracted.

A system according to the invention for marking a consignment unit in a logistics process has an apparatus through which the consignment unit is transportable. The apparatus is configured to record a first image of the surface of the consignment unit while the consignment unit is being transported through the apparatus. This first image represents a uniquely identifiable mapping of the surface of the consignment unit in the same way as a fingerprint. The apparatus is furthermore configured to forward the recorded image in the form of a data stream to a data processing unit. The data stream can be transmitted, for example, via a computer network, for example the Internet, to a central data processing unit of the logistics service provider.

In one advantageous embodiment of the system, the apparatus has a mount for a camera, wherein the camera is configured to record the first image of the surface of the consignment unit while the consignment unit is being transported through the apparatus. The camera may be a digital camera, in particular it may be the camera of a Smartphone. The mount can be designed in such a way that the user can temporarily set down a Smartphone, wherein the Smartphone is aligned in such a way that its camera can record an image of the surface of the consignment unit while the consignment unit is being transported through the apparatus.

In a further advantageous embodiment of the system, the mount is aligned in such a way that the camera is aligned at an angle of between 45° and 90° in relation to the surface of the consignment unit. Images which are recorded at an angle of between 45° and 90°, measured between the longitudinal axis of the camera lens and the surface of the consignment unit, have proven to deliver meaningful information relating to the surface structure of a consignment unit.

In a further advantageous embodiment of the system for marking a consignment unit in a logistics process, in addition to the previously described apparatus, the system has a central data processing unit and a second camera with which a second image of the consignment unit is recordable at a later time and wherein the data processing unit is configured to compare the first image with the second image and, in the event of a match between the first and second image to more than a previously set value, to identify the consignment unit of which the first image was recorded as identical to the consignment unit of which the second image was recorded.

If a logistics fee is linked to the first image of the consignment surface and to the identification number, it is possible to allocate the logistics fee to the sender insofar as the sender information is similarly linked to the identification number. The apparatus within the system through which the consignment unit is transportable may, for example, be a franking machine of the type normally used by shippers of substantial quantities of consignment units. Known franking machines of this type print franking marks on consignment units which are transported through the franking machine. Known machines of this type can be retrofitted with a mount by means of which a camera can be positioned. If consignment units are transported through the franking machine, the relevant logistics fee can be determined via the camera and/or a weighing machine which records the parameters determining the relevant logistics fee and can be linked to the identification number of the consignment unit. A franking mark does not have to be affixed to the consignment unit. The check to determine whether the correct logistics fee has been charged for a consignment unit is carried out via the recording of a second image of the surface of the consignment unit and the comparison with the data of the first image stored in the data processing unit. Underfranking or franking with counterfeit franking marks is therefore excluded. Printed or adhesive franking marks are no longer required. Consumables and wear materials such as printing ink and print stamps are similarly no longer required. The problems known from the prior art with barely legible or illegible franking marks and the associated increased complexity of the removal from automated sorting processes, manual sorting and returning to the sender are furthermore eliminated. Customer satisfaction is additionally increased and a time saving is achieved, since no consignments need to be erroneously returned to the sender and shipped once more. A preprocessing of the data by the logistics service provider is furthermore possible, since consignment data can already be transmitted to the data processing system of the logistics service provider before consignment units are physically collected from the customer or delivered by the customer to the logistics service provider. Since the data are known in advance, resources such as, for example, vehicles and personnel, can be made available for a collection of the consignment units from the customer according to the volume. The logistics service provider already has the facility to respond in advance to sudden changes in consignment units, such as those which occur, for example, in the pre-Christmas period. Simple consignment tracking is furthermore possible, since the consignment units are uniquely identifiable and their data are retrievable from the data processing unit. In addition, the logistics fee can be billed cumulatively to the respective senders on specific set dates.

Further advantages, special features and appropriate developments of the invention are set out in the subclaims and the following presentation of preferred example embodiments with reference to the drawings.

In the drawings:

FIG. 1 shows a top view of an apparatus according to the invention with consignment units passing through it.

FIG. 1 shows a top view of an apparatus 10 integrated into the system according to the invention with consignment units 20 passing through it. The illustrated apparatus 10 is based on a known franking machine for letters. The franking machine has a display 11. The display 11 can be designed as a touchscreen. An information text which can be printed onto the consignment unit 20 as an information imprint 23 can be entered via the display 11. The apparatus 10 has a mount 12 which holds a Smartphone 13. The Smartphone 13 is positioned an angle of approximately 180° in relation to the surface 21 of the consignment unit 20. With this alignment, the Smartphone camera lens is positioned an angle of approximately 90° in relation to the surface 21 of the consignment unit 20. A consignment unit 20 has address details 22 on its surface 21. The consignment unit 20 is fed to the apparatus 10, as shown by the dashed arrow. In the apparatus 10, the information imprint is printed onto the surface 21 of the consignment unit 20. The consignment unit 20 is transported through the apparatus 10, wherein, viewed in the direction of transport, the consignment unit 20 is transported through below a Smartphone 13 held by a mount 12 at the end of the apparatus 10. The Smartphone 13 has a camera (not shown) with which the Smartphone 13 creates a first image of the surface 21 of the consignment unit 20. The Smartphone 13 is connected wirelessly via a WLAN to a data processing unit 30, as shown by the dashed-dotted arrow. The Smartphone 13 transmits the first image in the form of an image file via the Internet to the data processing unit 30. In the data processing unit 30, the first image is linked to an identification number and is stored together with the identification number. Parameters for determining a logistics fee, for example the dimensions of the consignment unit 20, can be determined from the first image of the surface 21 of the consignment unit 20. In the data processing unit 30, the determined logistics fee can be linked to the identification number of the consignment unit 20, as a result of which it is possible to allocate the logistics fee to the sender, insofar as sender information is similarly linked to the identification number.

The embodiments shown here simply represent examples of the present invention and must not therefore be understood as limiting. Alternative embodiments considered by the person skilled in the art are similarly encompassed by the protective scope of the present invention.

REFERENCE NUMBER LIST

10 Apparatus
11 Display
12 Mount
13 Mobile device, Smartphone
20 Consignment unit
21 Surface
22 Address details
23 Information imprint

The invention claimed is:

1. A method for marking a consignment unit in a logistics process, the method comprising:
creating a first image of the surface of the consignment unit, the consignment unit being comprised of a letter or a parcel, wherein the first image characterizes the consignment unit, the surface of the consignment unit including a unique surface structure identifiable based on a resolution of the unique surface structure, where the unique surface structure is free from postal franking markings;
linking the first image with an identification number; and
storing the first image and the identification number on a data processing unit,
wherein the first image includes information relating to the unique surface structure, and
wherein the unique surface structure is linked to the identification number thus, the consignment unit can be identifiable by only the unique surface structure based on the resolution of the unique surface structure free from the postal franking markings.

2. The method as claimed in claim 1, wherein the first image is stored as an image file.

3. The method as claimed in claim 1, wherein the first image is created with a digital camera.

4. The method as claimed in claim 3, wherein the digital camera is integrated into a mobile device which is connected to a data transmission network and has functionalities of a computer system, and wherein the data transmission network is connected to a data processing unit and a computer program by means of which the first image is transferred onto the data processing unit runs on the mobile device.

5. The method as claimed in claim 1, wherein a logistics fee is linked to the first image.

6. The method as claimed in claim 1, wherein a second image of the consignment unit is created at a later time, and wherein the second image is compared with the first image and the consignment unit is classified as identical to that of the first image if the first image and the second image match one another.

7. The method as claimed in claim 1, wherein a logistics fee is determined with the creation of a first image of the surface of the consignment unit and is linked to the first image and the identification number linked to the first image and is stored on the data processing unit.

8. A system for marking a consignment unit in a logistics process comprising:
an apparatus through which the consignment unit is transportable, the apparatus being configured to record a first image of a surface of the consignment unit while the consignment unit is being transported through the apparatus, wherein a structure of the surface of the consignment unit is mappable, and wherein the apparatus is configured to forward the recorded image in the form of a data stream to a data processing unit,
wherein the structure of the surface is linked to an identification number thus, the consignment unit can be identifiable by only the structure of the surface based on a resolution of the structure of the surface, where the structure of the surface is free from postal franking markings,
wherein the consignment unit is a letter or a parcel.

9. The system as claimed in claim 8, wherein the apparatus has a mount for a camera, and wherein the camera is configured to record the first image of the surface of the consignment while the consignment unit is being transported through the apparatus.

10. The system as claimed in claim 9, wherein the mount is aligned in such a way that the camera is aligned in such a way that the longitudinal axis of the camera lens is aligned at an angle of between 45° and 90° in relation to the surface of the consignment unit.

11. The system as claimed in claim 8 further comprising a central data processing unit and a second camera with which a second image of the consignment unit is recordable at a later time, wherein the central data processing unit is configured to compare the first image with the second image and, in the event of a match between the first and second image of more than a previously set value, to identify the consignment unit of which the first image was recorded as identical to the consignment unit of which the second image was recorded.

* * * * *